Sept. 22, 1953           F. A. VEDDER           2,652,814
WATER TUBE BOILER
Filed July 5, 1951                           2 Sheets-Sheet 1
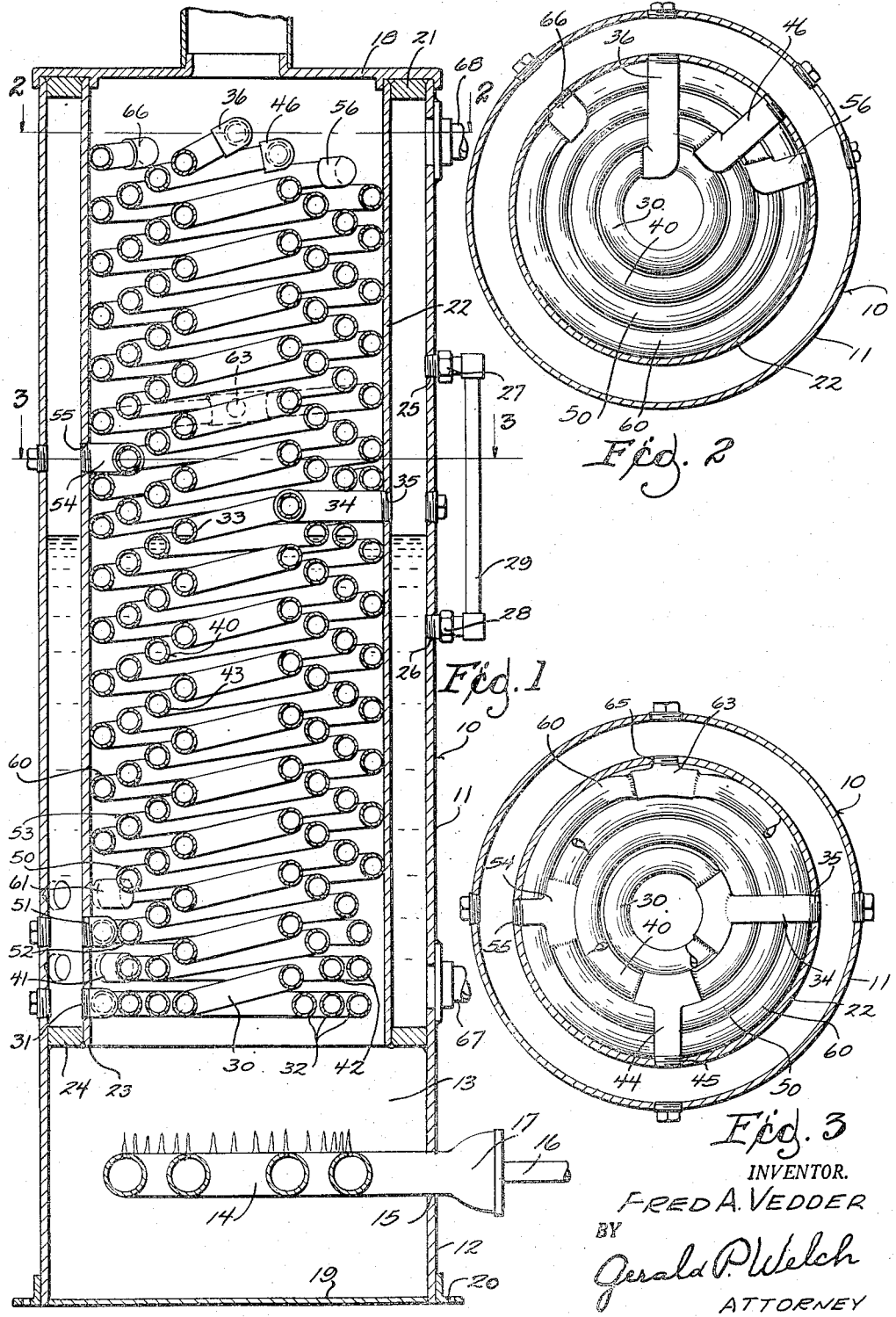
INVENTOR.
FRED A. VEDDER
BY
Gerald P. Welch
ATTORNEY

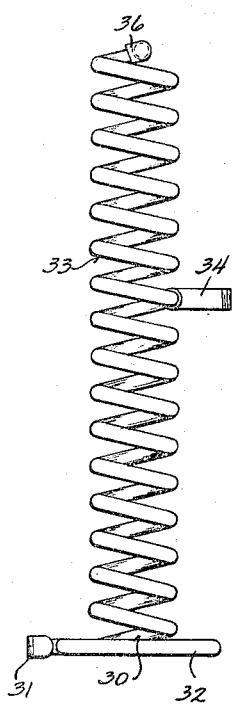 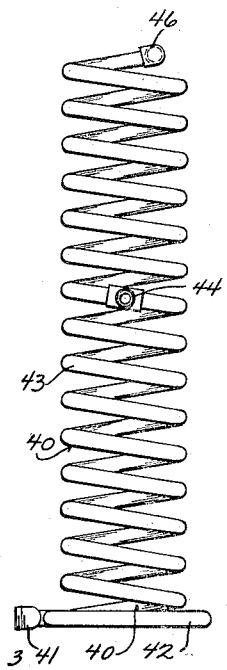 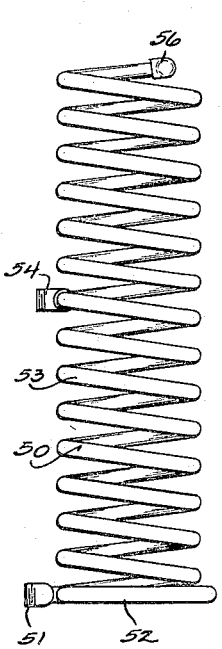 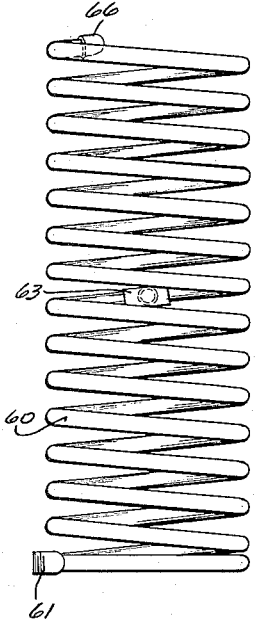
Fig. 8  Fig. 9  Fig. 10  Fig. 11
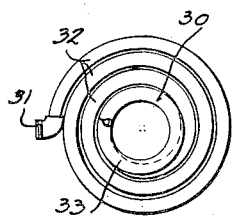 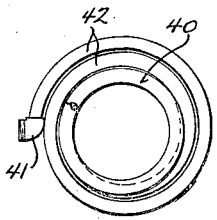 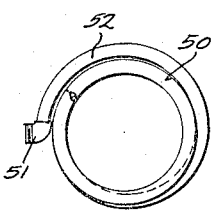 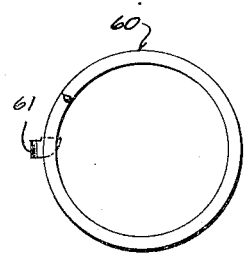
Fig. 4  Fig. 5  Fig. 6  Fig. 7

Patented Sept. 22, 1953

2,652,814

UNITED STATES PATENT OFFICE 2,652,814

WATER TUBE BOILER

Fred August Vedder, Okauchee, Wis.

Application July 5, 1951, Serial No. 235,165

2 Claims. (Cl. 122—169)

This invention relates to improvements in water tube boilers, and more particularly to a novel water tube boiler of the helical tube type.

An object of the invention is to provide a device of the type in which pluralities of helical tube circuits are arranged to secure a maximum of heat transmission in a given space.

Another object of the invention is to provide a highly economical device of the type of a compact design and having a maximum fluid heating capacity.

Other and further objects of the invention will appear as the description proceeds, reference being had to the accompanying drawing, in which:

Fig. 1 is a vertical sectional view through a water tube boiler embodying the invention.

Fig. 2 is a view on line 2—2 of Fig. 1.

Fig. 3 is a view on line 3—3 of Fig. 1.

Fig. 4 is a plan view in elevation of one of the helical tube circuits.

Fig. 5 is a similar view of a progressively larger helical tube assembly.

Fig. 6 is a similar view of another coil in said boiler.

Fig. 7 is a similar view of the outer coil in the boiler.

Fig. 8 is a vertical view in elevation of one of the helical tube circuits.

Fig. 9 is a similar view of a progressively larger helical tube assembly.

Fig. 10 is a similar view of another coil in said boiler.

Fig. 11 is a similar view of the outer coil in the boiler.

Referring more particularly to the drawings, the numeral 10 refers to the boiler generally having an outer cylindrical wall 11, forming within its lower end 12 the fire-box 13 provided with a fuel burner 14 introduced thru an aperture at 15 of the wall 11, and provided with the fuel inlet pipe 16 and the air mixer 17.

The outer cylindrical wall 11 is provided with a cover cap 18, a bottom member 19 and the surrounding flange 20. An annular spacer ring 21 just under the cap 18 has interiorly thereof the jacket wall 22, and a second spacer ring is held between the lower end 23 of said jacket wall 22 and the outer wall 11, and is designated by the numeral 24.

The outer wall 11 is apertured at 25 and 26 to accommodate the unions 27 and 28 in which the water gauge 29 is mounted.

A copper tube coil 30 Fig. 4 has a connection at 31 with the jacket wall 22 adjacent the lower end thereof and has a spirally laid portion 32 integrally formed with an upwardly disposed helical coil 33. The said coil 33 is connected by means of a T member 34 with an aperture at 35 of the jacket wall 22, and by an angular pipe 36 at its upper end with said jacket wall 22.

A second copper tube coil 40 Fig. 5 has a connection at 41 with the jacket wall 22 and has a spirally laid portion 42 integrally formed with an upwardly disposed helical coil 43. The said coil 43 is connected by means of a T member 44 Fig. 3 with an aperture at 45 of the jacket wall 22, and by an angular portion 46 at its upper end with said jacket wall 22.

A third copper tube coil 50 Fig. 6 has a connection at 51 with the jacket wall 22 and has a spirally laid portion 52 integrally formed with an upwardly disposed helical coil 53. Said coil 53 is connected by means of T member 54 with an aperture at 55 of the jacket wall 22, and by angular pipe means 56 at its upper end with the jacket wall 22.

A fourth and outermost coil 60 Fig. 7 has a connection at 61 with the jacket wall 22 and has helical formation throughout its length, being connected by means of T member 63 Fig. 3 with an aperture at 65 of the jacket wall 22, and by angular pipe means 66 at its upper end with the jacket wall 22.

A flue for burnt gases extends upwardly from the cover cap 18, and the outer wall 11 has the water inlet opening at 67 and the vapor outlet port 68 communicating with the jacket formed by the outer wall 11, the jacket wall 22 and the spacer rings 21 and 24.

In use, water is fed into the inlet opening at 67 until the gauge indicates the proper level has been attained, and upon activation of the burner 14 the close proximity of the coils 30, 40, 50 and 60 will facilitate a maximum amount of heat transference, with a resultant rapid heating of the water and conversion thereof into steam.

It will be understood that the device is capable of many modifications in structure and design, without departing from the spirit of the invention, within the scope of the appended claims.

Having thus described the invention, what is claimed and desired to be secured by Letters Patent of the United States is:

1. A boiler of the character described comprising an upright cylindrical tank having a flue in its upper end and a heater compartment in the lower end thereof, a jacket wall within the upper portion of said tank, spacer means between said tank and the jacket wall defining a water reservoir, and a plurality of helically coiled vertically extending tubes nested within the jacket wall disposed concentrically along a vertical axis each communicating separately with said reservoir centrally and at both ends.

2. A boiler of the character described comprising an upright cylindrical tank having a flue in its upper end and a heater compartment in the lower end thereof, a cylindrical jacket wall spaced interiorly of said tank, spacer means at top and bottom of said jacket wall between the latter and said tank to define a water reservoir, a plurality of helically wound coiled tubes one nested inside the other and mutually spaced, certain of said coiled tubes wound spirally on a plane at bottom and helically coiled upwardly thereof, and pipe means connecting said coiled tubes with said reservoir centrally and at upper and lower ends thereof.

FRED AUGUST VEDDER.

References Cited in the file of this patent

UNITED STATES PATENTS

| Number | Name | Date |
| --- | --- | --- |
| 384,695 | Jewett | June 19, 1888 |
| 484,716 | Hosmer | Oct. 18, 1892 |
| 534,494 | Coe | Feb. 19, 1895 |
| 1,520,084 | Risheill et al. | Dec. 23, 1924 |
| 1,599,169 | Dykes | Sept. 7, 1926 |
| 2,252,140 | Seamons | Aug. 12, 1941 |
| 2,304,409 | Jeffords | Dec. 8, 1942 |